F. S. ALLEN.
CAPSTAN AND WINDLASS.

No. 183,101.  Patented Oct. 10, 1876.

Witnesses:
Theodore Hooper
B. S. Clark

Inventor:
Frederick S. Allen
By Fitch & Fitch
Attys

UNITED STATES PATENT OFFICE.

FREDERICK S. ALLEN, OF GOSNOLD, MASSACHUSETTS.

IMPROVEMENT IN CAPSTANS AND WINDLASSES.

Specification forming part of Letters Patent No. 183,101, dated October 10, 1876; application filed August 25, 1876.

*To all whom it may concern:*

Be it known that I, FREDERICK S. ALLEN, of Gosnold, county of Dukes, in the State of Massachusetts, have invented an Improved Windlass, of which the following is a full, clear, and exact description, reference being had to the accompanying drawings, forming part of this specification.

My invention consists in the combination, with the ratchet-wheel of a windlass, of a link and push-pawl, both pivoted or hinged to and operated by the same lever, and acting, as hereinafter particularly set forth, to give the said ratchet-wheel a continuous revolution in one direction.

Figure 1:
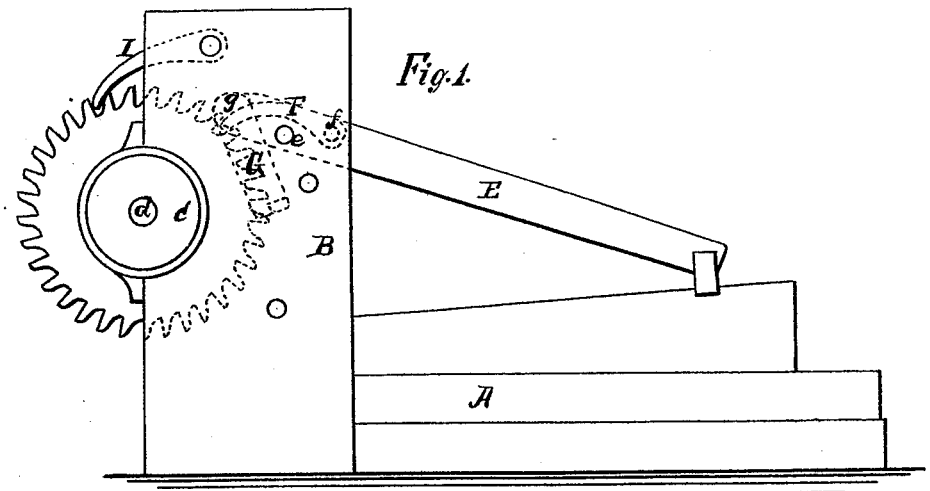
Figure 2:
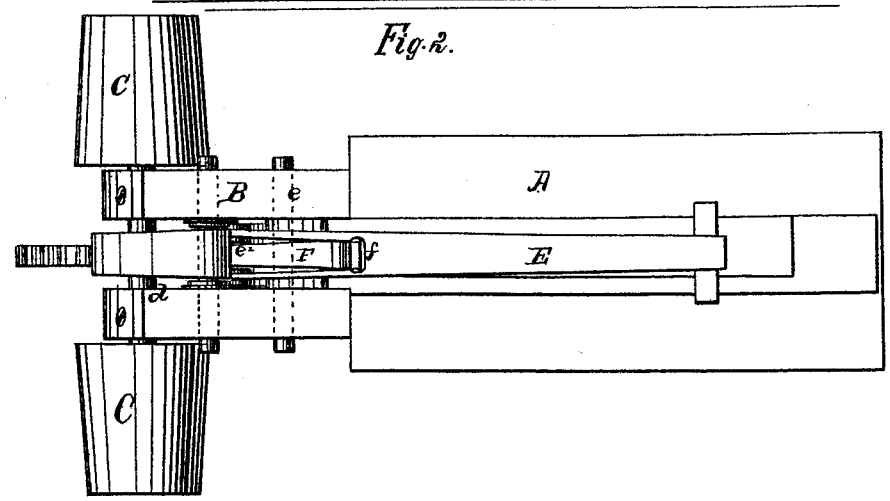
Figure 3:
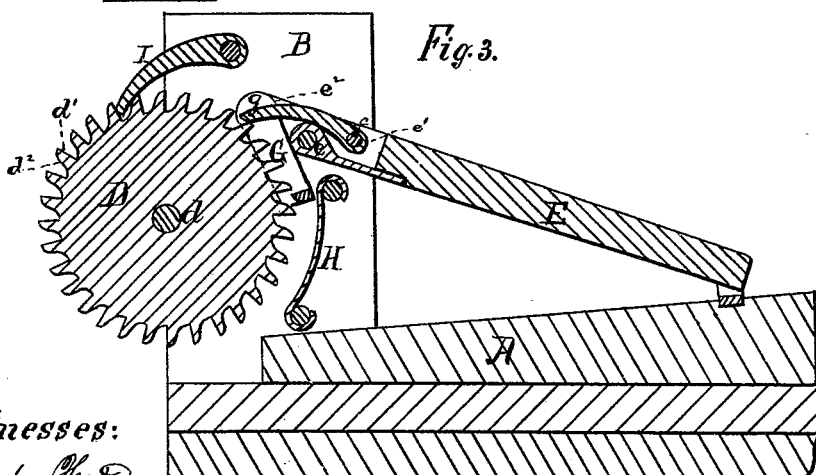

Figure 1 is a side elevation of a windlass embodying my invention. Fig. 2 is a plan of the same; and Fig. 3 is a longitudinal central sectional view of the same.

A is the standard. B is the upright frame for the windlass and lever. C is the windlass. D is the ratchet-wheel, preferably of metal—such as iron—and mounted on the windlass-shaft $d$, which has bearings in the frame B, the said wheel operating to revolve the windlass. E is the operating lever, which is pivoted at $e$ in the frame B, as shown. F is a pawl, which is pivoted at $f$ to the lever E, back of the pivot $e$ of said lever—that is, on the side of said pivot opposite to the ratchet-wheel, or to the long arm of said lever E. The said lever is channeled out at $e^1$ to permit the pawl to be pivoted within it, and the said pawl extends over the pivot $e$ of the lever to, and engages the ratchet-wheel D on, the top thereof, as shown, the end of the lever being bifurcated at $e^2$ to permit the pawl to reach the wheel, as shown. G is a second pawl, which is pivoted or hinged at $g$ to the lever E, in front of the pivot $e$ thereof—that is, on the same side of the pivot as the ratchet-wheel D, or the short arm of said lever E. This pawl is pivoted to the ends of the bifurcations of the lever, and depends downward therefrom to the rear side of the wheel D, which it engages, as shown. A guide-plate, H, is fixed in the frame B, against which the link G travels, and which serves to hold the said pawl against the wheel. A stop-pawl, I, is arranged in the frame B at the top of the ratchet-wheel, to prevent any back movement of the ratchet.

The teeth upon the ratchet-wheel D are made with their faces $d^1$, against which the pawls exert their force in revolving the wheel, perpendicular to the axis of the wheel, and with their faces $d^2$ curved or beveled, so that the pawls will easily escape from one tooth to another.

Now, it is evident that, the lever E being carried to the perpendicular position, the pawl F will operate to push the ratchet-wheel D part way through a revolution, while the link G will slip over the teeth on the rear side to near the under part of the wheel D, and that, the lever being brought back to the horizontal position, the link G will operate to pull the ratchet-wheel, and thus continue the revolution thereof, the pawl F slipping over the teeth of said wheel meanwhile, and that by this means the continued oscillation of the lever will operate through the said pawls alternately to maintain a continuous revolution of the ratchet, and consequently of the windlass, thus avoiding all lost motion.

What I claim as my invention, and desire to secure by Letters Patent, is—

In a windlass, the combination, with the ratchet-wheel D, as described, of the link G and its guide-plate H, and the push-pawl F, pivoted, respectively, to the short and long arms at $f$ and $g$ of the channeled and bifurcated lever E, together with a stop-pawl, I, whereby, by the oscillation of the lever E, the link G and pawl F will operate alternately to revolve the wheel D in the same direction, as and for the purpose specified.

FREDERICK SLOCUM ALLEN.

Witnesses:
H. J. FULLER,
F. M. MITCHELL.